United States Patent
Weir

(10) Patent No.: US 8,252,175 B2
(45) Date of Patent: Aug. 28, 2012

(54) APPARATUS FOR SEPARATING FISH FROM DEBRIS AND ALLOWING WATER PASSAGE

(76) Inventor: Robert K. Weir, Denver, CO (US)

( * ) Notice: Subject to any disclaimer, the term of this patent is extended or adjusted under 35 U.S.C. 154(b) by 1206 days.

(21) Appl. No.: 12/075,167

(22) Filed: Mar. 10, 2008

(65) Prior Publication Data

US 2009/0223459 A1    Sep. 10, 2009

(51) Int. Cl.
*B01D 33/70* (2006.01)
(52) U.S. Cl. ............................ 210/151; 210/220
(58) Field of Classification Search .............. 210/151, 210/220
See application file for complete search history.

(56) References Cited

U.S. PATENT DOCUMENTS

| | | | | |
|---|---|---|---|---|
| 3,194,008 A * | 7/1965 | Baumgartner | ............... | 60/495 |
| 3,412,482 A * | 11/1968 | Kusmer | ............... | 434/300 |
| 3,466,866 A * | 9/1969 | Eschenfeld | ............... | 60/496 |
| 3,616,942 A * | 11/1971 | Gruber | ............... | 414/627 |
| 3,907,454 A * | 9/1975 | Punton | ............... | 415/5 |
| 3,934,964 A * | 1/1976 | Diamond | ............... | 415/7 |
| 4,054,031 A * | 10/1977 | Johnson | ............... | 60/496 |
| 4,084,375 A * | 4/1978 | Horvath | ............... | 60/496 |
| 4,141,218 A * | 2/1979 | Rayboy | ............... | 60/641.13 |
| 4,169,792 A * | 10/1979 | Dovel | ............... | 210/793 |
| 4,233,813 A * | 11/1980 | Simmons | ............... | 60/496 |
| 4,245,473 A * | 1/1981 | Sandoval | ............... | 60/496 |
| 4,326,132 A * | 4/1982 | Bokel | ............... | 290/1 R |
| 4,363,212 A * | 12/1982 | Everett | ............... | 60/496 |
| 4,385,497 A * | 5/1983 | Scott | ............... | 60/639 |
| 4,407,130 A * | 10/1983 | Jackson | ............... | 60/496 |
| 4,415,462 A | 11/1983 | Finch et al. | | |
| 4,521,305 A | 6/1985 | Deal | | |
| 4,551,042 A | 11/1985 | Hagedorn et al. | | |
| 4,929,350 A | 5/1990 | Wade et al. | | |
| 4,981,015 A * | 1/1991 | Simpson | ............... | 60/496 |
| 5,078,579 A | 1/1992 | Ryan | | |
| 5,558,042 A | 9/1996 | Bradley et al. | | |
| 5,928,123 A * | 7/1999 | Davis, Jr. | ............... | 493/316 |
| 6,149,393 A | 11/2000 | Chancellor | | |
| 6,237,342 B1 * | 5/2001 | Hurford | ............... | 60/721 |
| 6,457,436 B1 | 10/2002 | Truebe et al. | | |
| 2002/0144864 A1 * | 10/2002 | Kramer | ............... | 184/35 |
| 2005/0252376 A1 * | 11/2005 | McNulty | ............... | 95/263 |
| 2006/0156718 A1 * | 7/2006 | Petkovic | ............... | 60/496 |

* cited by examiner

*Primary Examiner* — Chester Barry
(74) *Attorney, Agent, or Firm* — The Reilly Intellectual Property Law Firm, P.C.; Ellen Reilly; John E. Reilly

(57) ABSTRACT

A method and apparatus for separating fish and debris from water, the apparatus being made up of a frame member within which a rotating drum member is mounted, the drum member containing circumferentially mounted, longitudinally extending chamber members with an open side, and an air distribution member for inducing air into the chambers, facilitating rotation of the drum member. The method and apparatus are conformable for use in areas where the flow of water is a concern.

21 Claims, 13 Drawing Sheets

APPARATUS FOR SEPARATING FISH FROM DEBRIS AND ALLOWING WATER PASSAGE

BACKGROUND AND FIELD

A method and apparatus for filtering debris; and more particularly relates to a novel and improved method and apparatus for separating fish from debris and allowing water passage for all ranges of liquid flow.

Rotational drum screens for filtering water and separating debris are known in the prior art. Typical rotating drum screens require frequent maintenance and are difficult to clean as well as being costly. The drum filter typically includes a rotating drum positioned in a filter container. Water flows into and through the container, passing through the filtering screen of the drum. Debris typically lodges on the face of the drum screen filter, requiring a screen cleaning device to prevent complete obstruction of water flow. Currently, drums have been turned using one of three traditional methods; overshot, undershot and gear motor. The overshot drum relies upon the passage of water through the top 45% of the drum face. The lower 55% of the drum face is protected by a shroud that covers this portion of the drum. While this rotation is effective in providing a clean drum, the quantity of flow is severely limited due to the drum surface area that the water can flow through, and the requirement that the water level on the downstream side of the drum must be substantially lower than on the upstream side of the drum.

The undershot drum utilizes the full face of the drum for water to pass through. The rotation of this drum is accomplished with a paddle wheel on the inside of the drum and a gear train to drive the rotation of the drum member. As the water flows through the drum, the momentum and mass of the water flow drive the rotation of the paddle wheel. The drum rotation is in the opposite direction of the rotation of the paddle wheel. As is common with any mechanical gear driven device, maintenance may be difficult and costly. Where there is insufficient differential head across the drum, the drum will fail to rotate and typically become congested with debris. Low flows and low differential head severely impact the rotation of the drum and operation in a self-cleaning mode.

Where commercial power is available, or where solar panels and battery storage is provided, it is possible to drive a drum utilizing a gear motor, sprockets and a chain drive mechanism. The drums can be effectively rotated and the flow-through capacity can be high or low, although external electric motors, chains and sprockets provide a degree of liability and maintenance that often is not desirable.

An important application for rotational drum screens includes the filtration of water in rivers, lakes and streams whereby fish are retained in a designated area while debris is removed and filtered water is allowed to pass through the drum into an outlet. This is especially important to prevent endangered species of fish from passing through into agricultural diversions. The rotating drum is positioned perpendicular to the flow of water and rotation of the screen allows for filtration of the water while preventing fish from passing into an outlet.

Accordingly, there is a serious need for a self-cleaning rotating drum screen that also effectively acts as a fish deterrent while providing drum rotation irrespective of the flow rate of the water as well as providing a state-of-the-art filtration device that does not require an integrated electric motor to provide for rotation of the drum.

SUMMARY

The embodiments and methods set forth are exemplary and not for purposes of limitation.

Accordingly, there is disclosed a novel and improved method and apparatus for separating fish from debris and allowing water passage without the need for electric motors and without concern for water flow.

In accordance with the present embodiments, apparatus is provided for separating fish from debris over all ranges of liquid flow having a drum member rotatably mounted on a frame housing, the drum member having an exterior screen in the path of flow of the water passage, a plurality of circumferentially spaced chamber members secured within an interior of the drum member, and an air pressure system for distributing air throughout the chamber member.

The foregoing examples of the related art and limitations related therewith are intended to be illustrative and not exclusive. Other limitations of the related art will become apparent to those skilled in the art upon a reading of the Specification and study of the Drawings. In addition to the exemplary aspects and embodiments described above, further aspects and embodiments will become apparent by reference to the Drawings and by study of the following Description.

DETAILED DESCRIPTION

Figure 1:
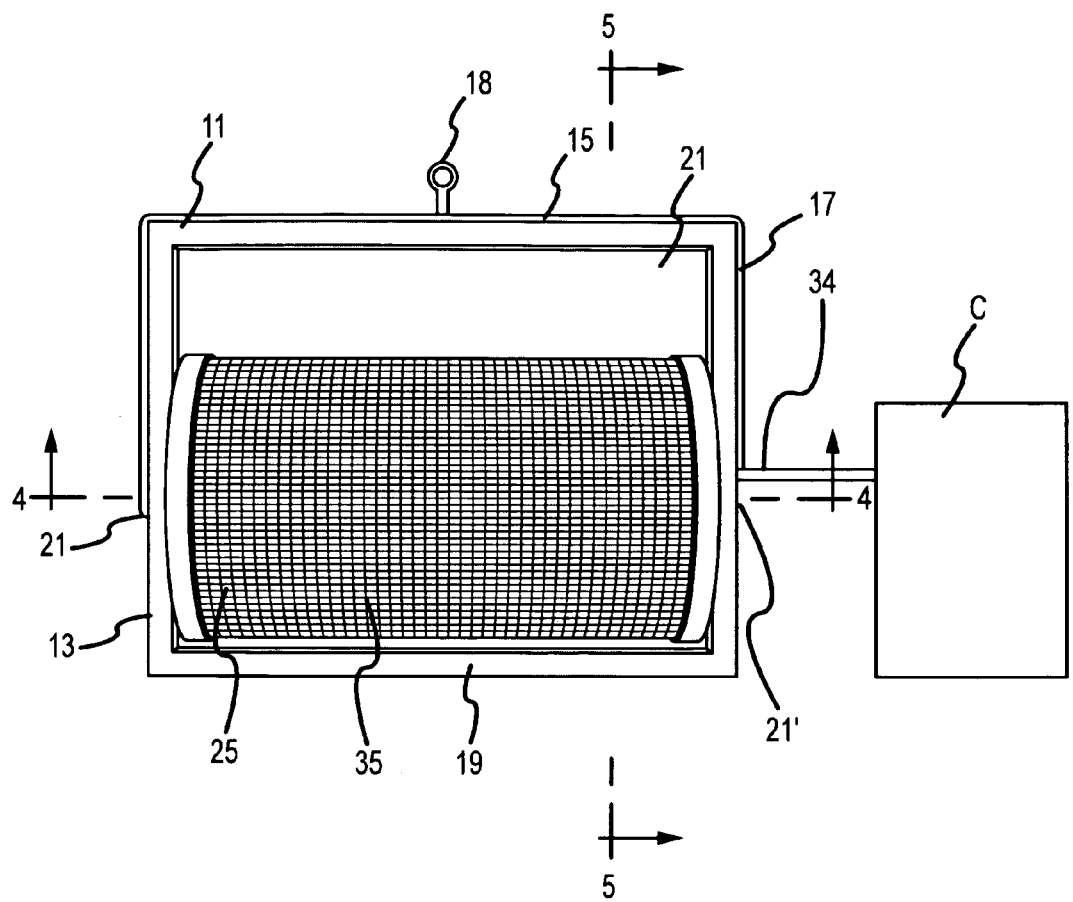
FIG. 1 is a side view of a form of drum rotation apparatus.
Figure 2:
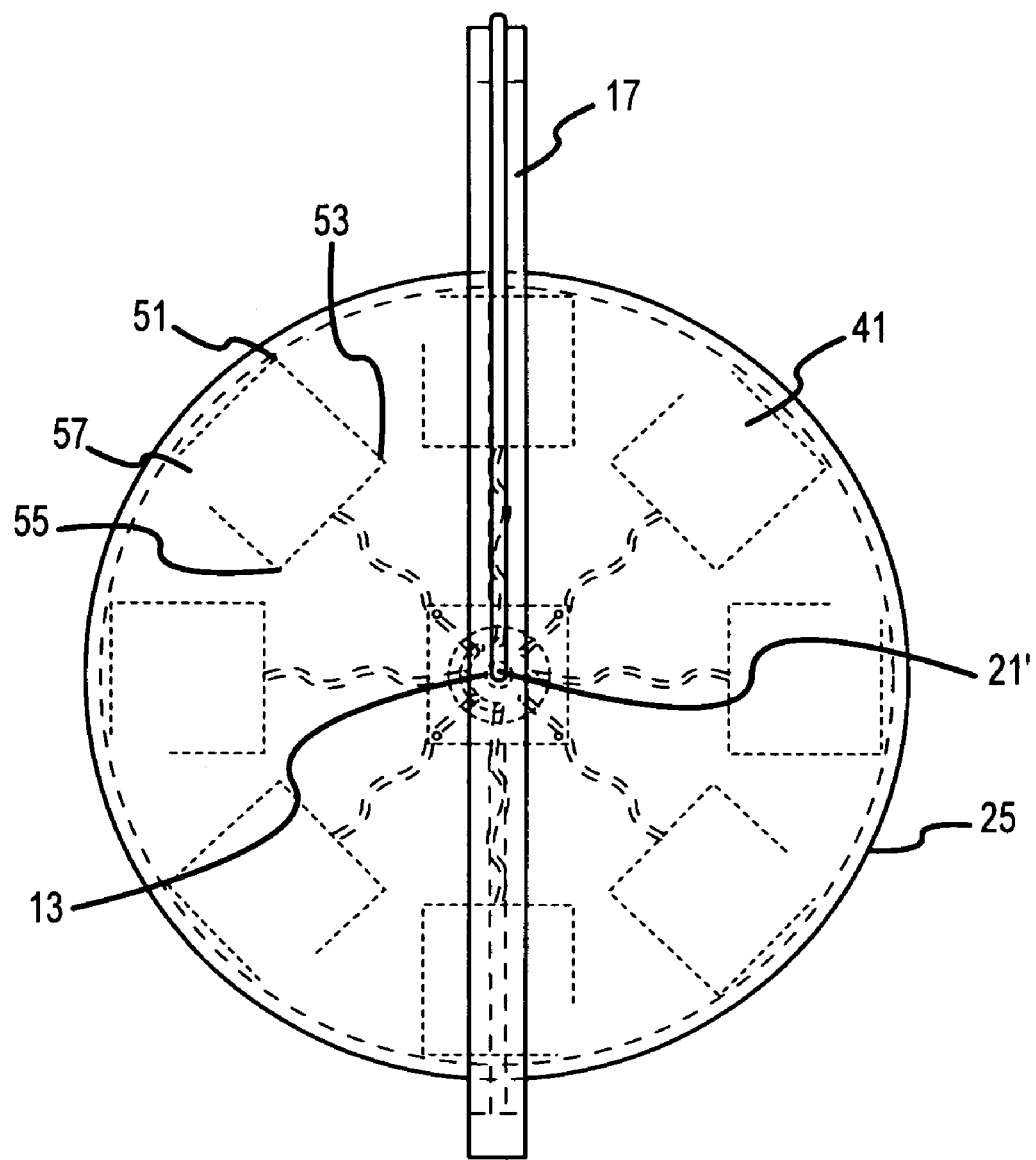
FIG. 2 is front view of the drum rotation apparatus of FIG. 1.
Figure 3:
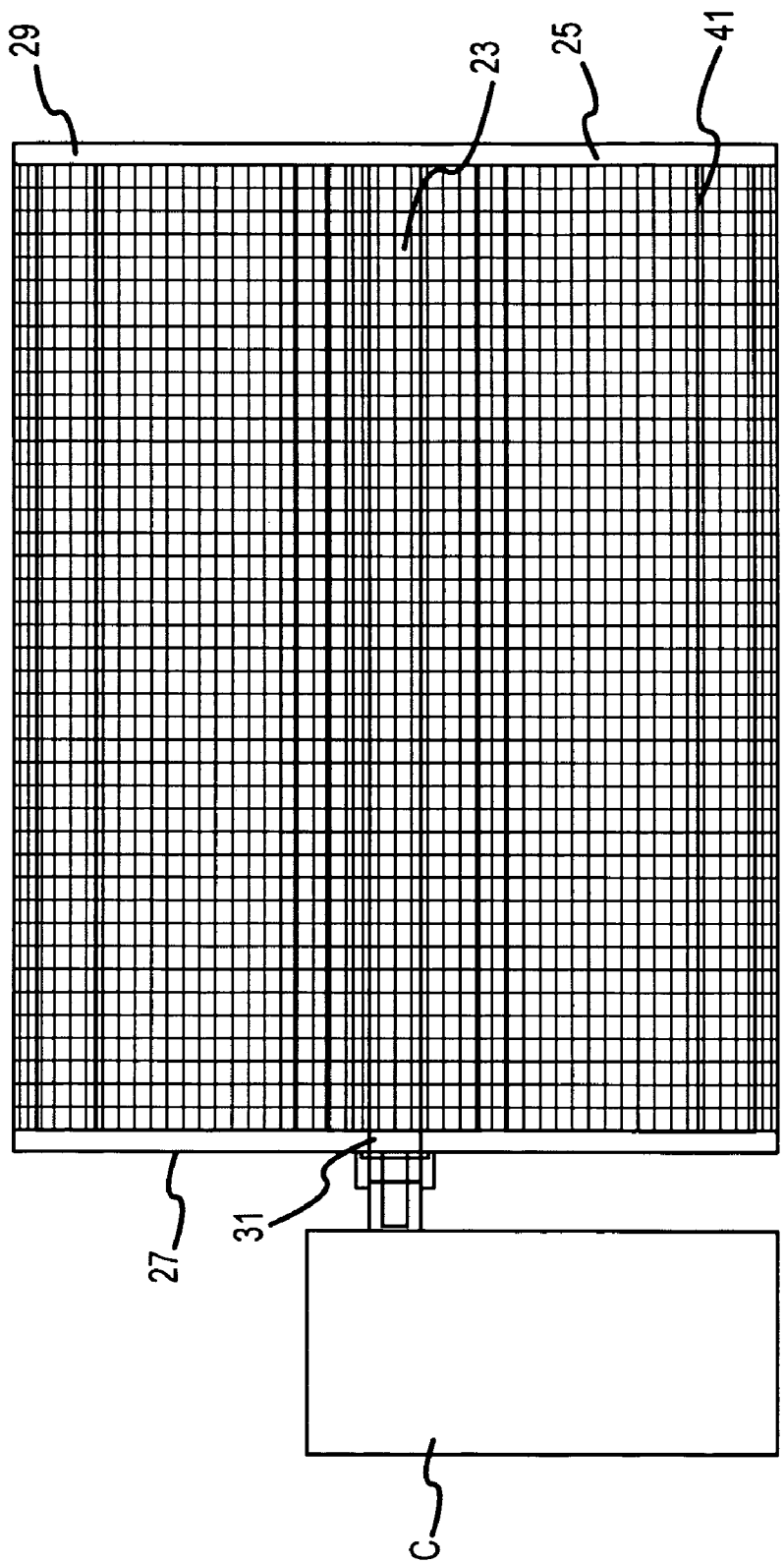
FIG. 3 is a side view of a form of drum rotation apparatus.
Figure 4:
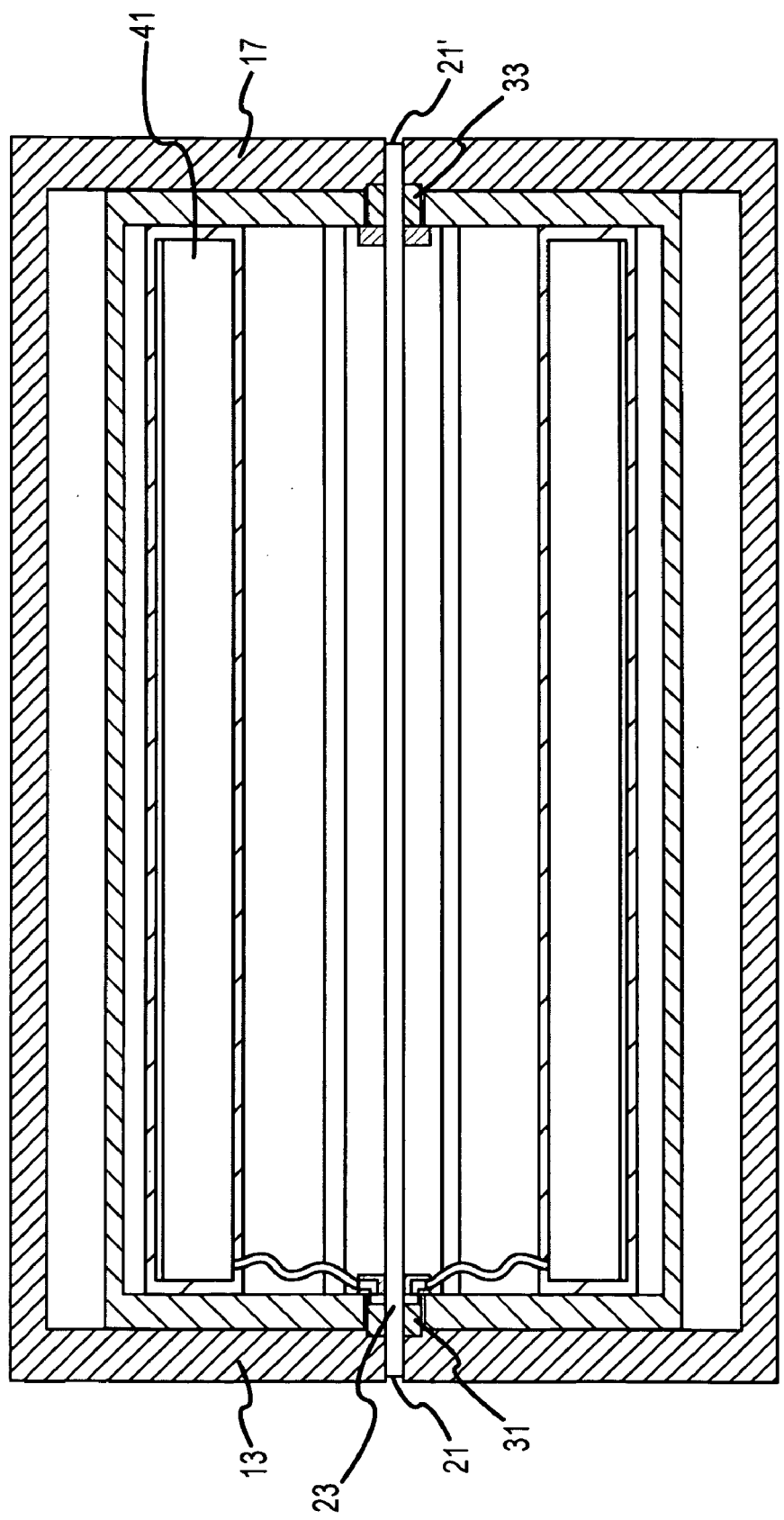
FIG. 4 is a cross-sectional view about lines 4-4 of the drum rotation apparatus of FIG. 1.

Referring in more detail to the drawings, there is shown by way of illustrative example in FIGS. 1 to 17 various forms of an air-induced rotation device. The apparatus includes a rectangular frame 11 having four closed sides 13, 15, 17, 19 defining a rectangular support. The side portions 13 and 17 have bosses 21, 21' for inserting an axle or shaft 23 therethrough, as shown in FIG. 4. The axle 23 extends through each opening 21, 21', and a drum member 25 is rotatably mounted on the axle 23. The drum member 25 is cylindrical having opposite end walls or drum hubs 27 and 29 the axle 23 being mounted in bearings 31 and 33 as shown in FIG. 3 and FIG. 4. A filter screen 35 may be mounted on the exterior of the drum member 25. The filter screen 35 is preferably a wedge wire screen 37, as shown in FIG. 1, having horizontally extending, vertically spaced, wedge wires traversing the entire width of the drum member 25 between the opposite end walls 27 and 29. The filter screen 35 aids in removing and transporting debris on the face of the screen while preventing fish from passing through the drum screen. A lifting eye 18 is provided for ease of positioning the frame 11 and drum member 25 in a desired location with a crane or other large machinery.

Figure 5:
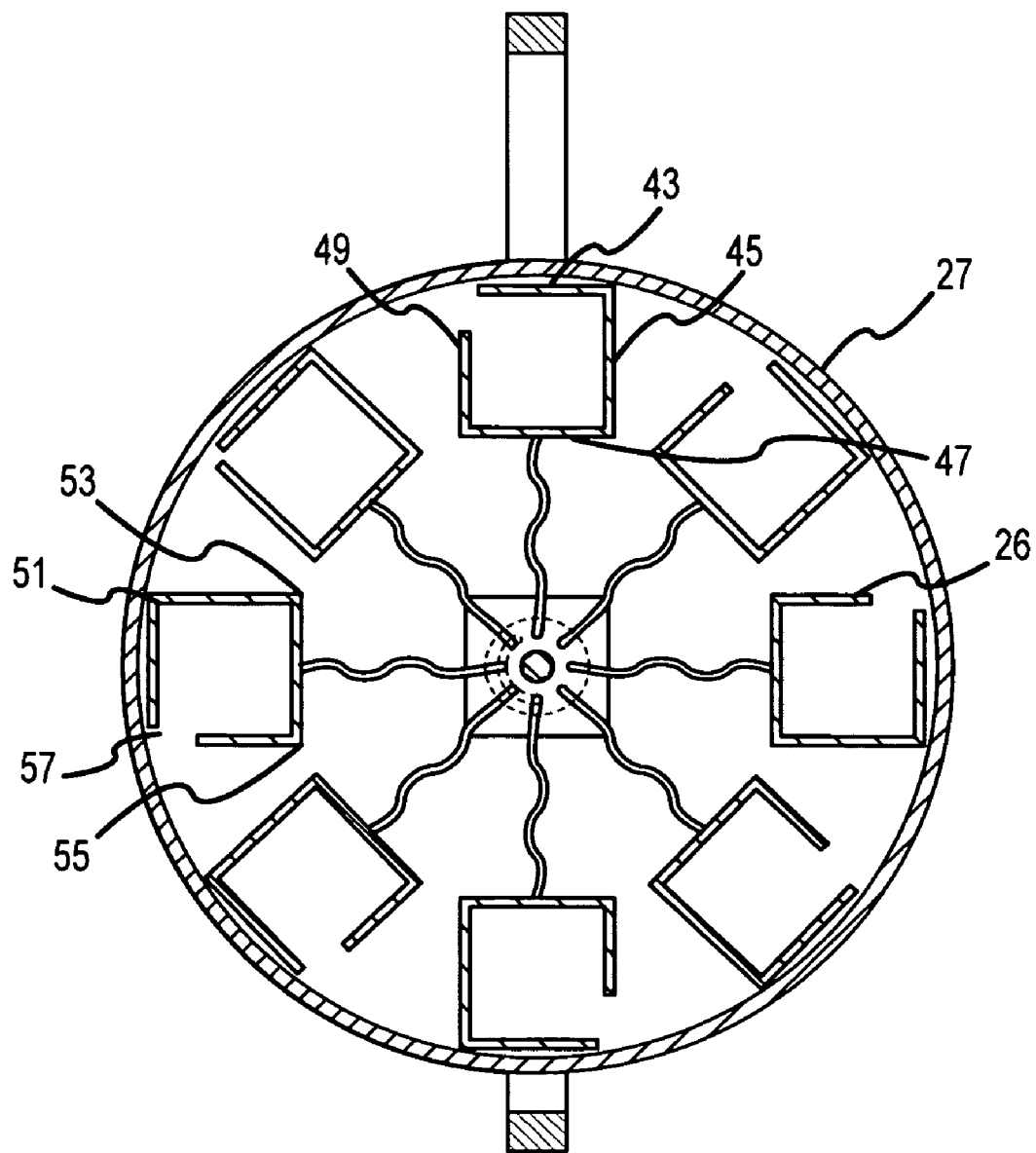
FIG. 5 is a cross-sectional view about lines 5-5 of the drum rotation system of FIG. 1.
Figure 6:
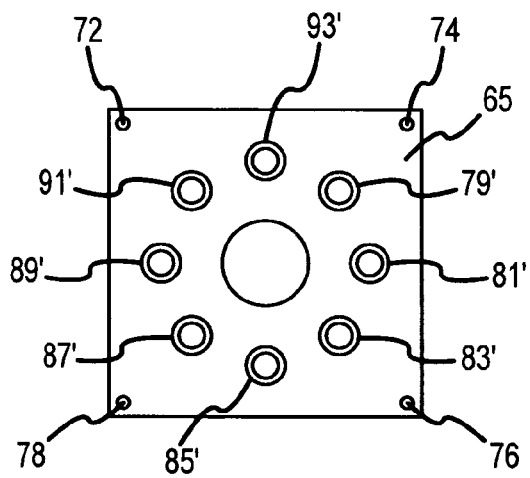
FIG. 6 is a front view of an air distribution block.
Figure 7:
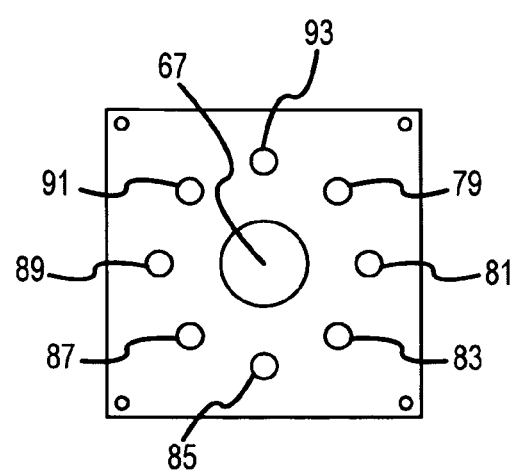
FIG. 7 is a rear view of the air distribution block of FIG. 6.
Figure 8:
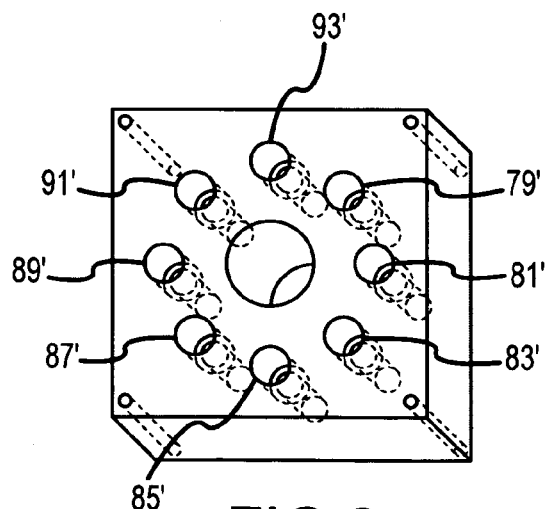
FIG. 8 is a perspective view of the air distribution block of FIG. 6.
Figure 9:
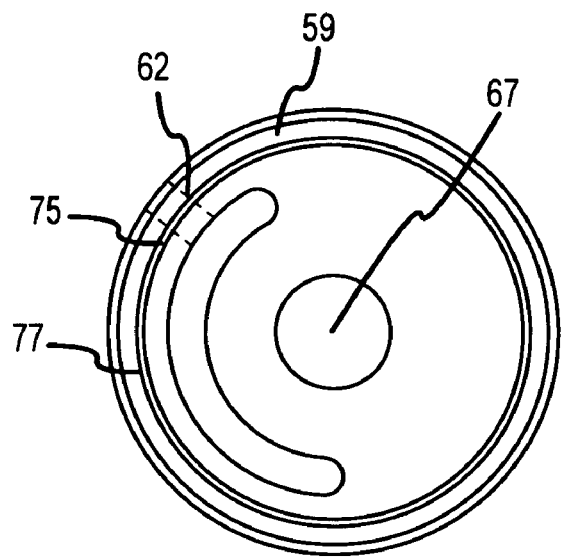
FIG. 9 is a front view of an air supply manifold.
Figure 10:
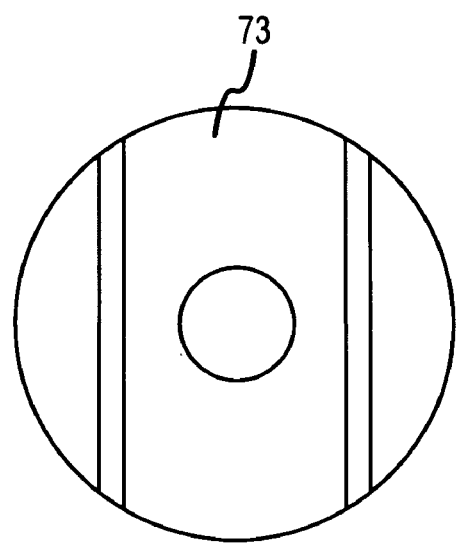
FIG. 10 is a rear view of the air supply manifold of FIG. 9.
Figure 11:
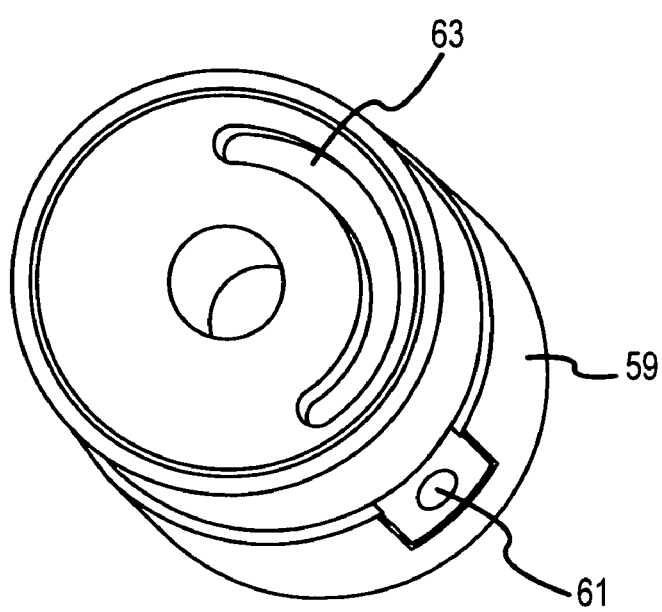
FIG. 11 is a perspective view of the air supply manifold of FIG. 9.
Figure 12:
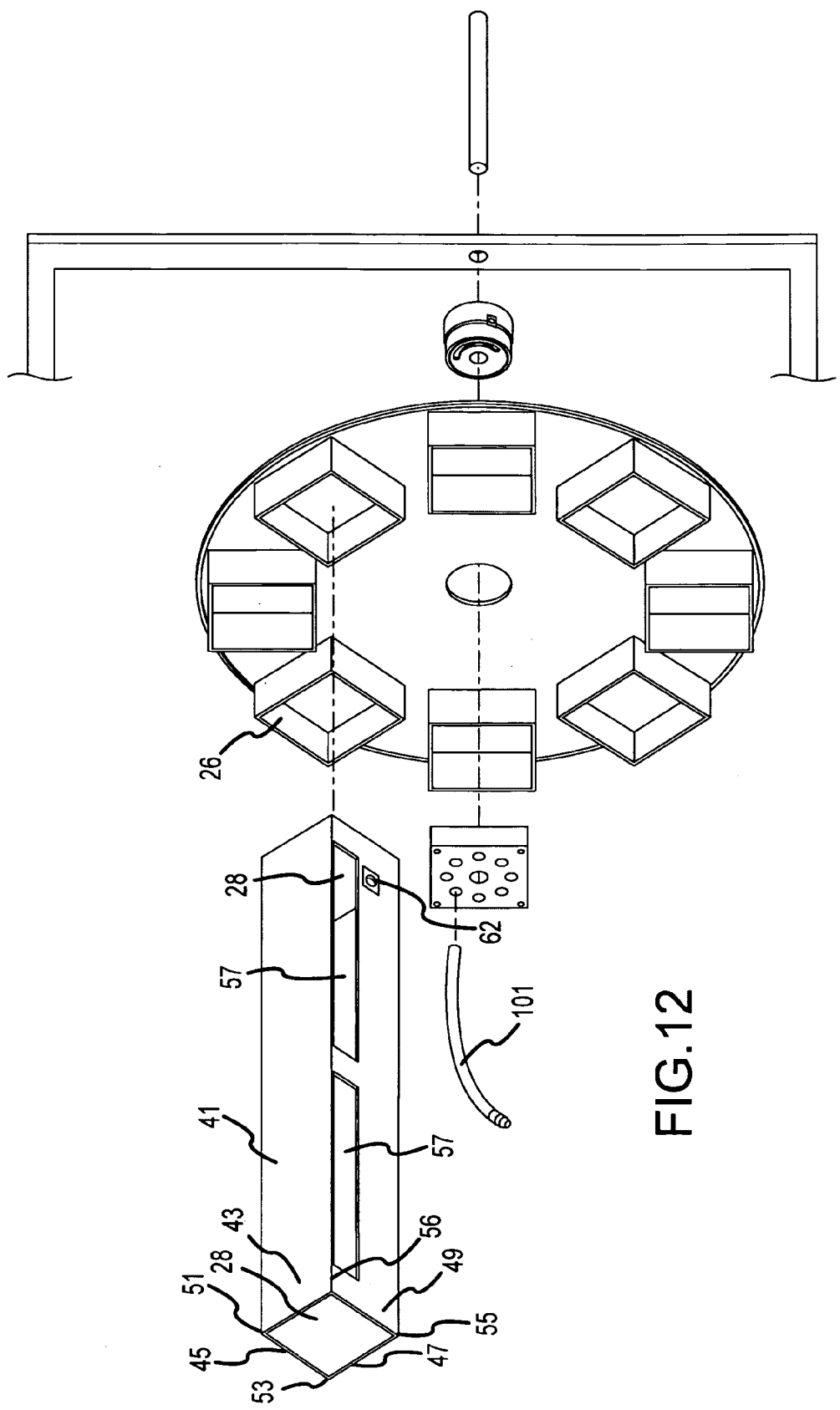
FIG. 12 is an exploded view of a partial air distribution system of the present device.
Figure 13:
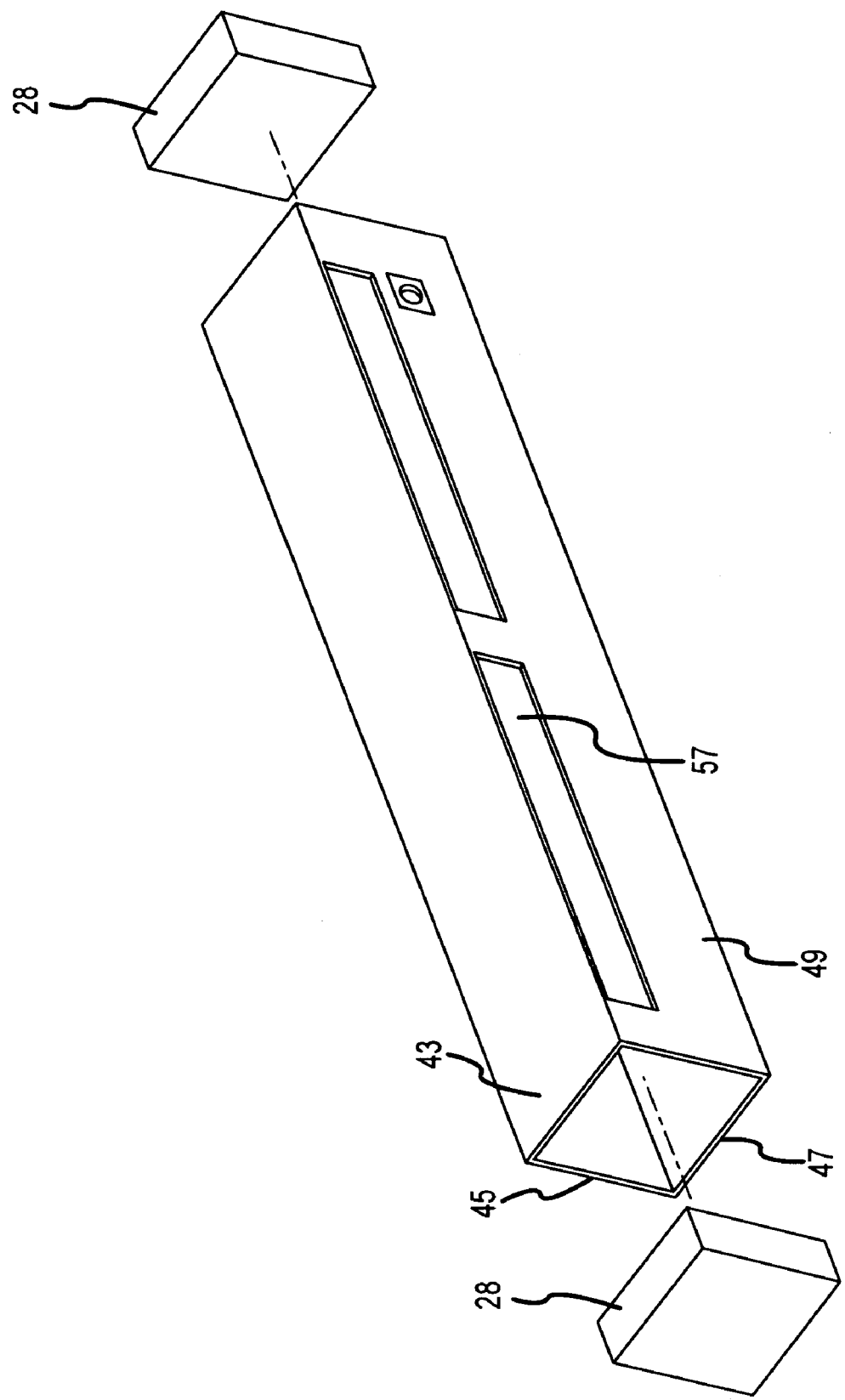
FIG. 13 is a perspective view of a chamber shown in FIG. 3.
Figure 14:
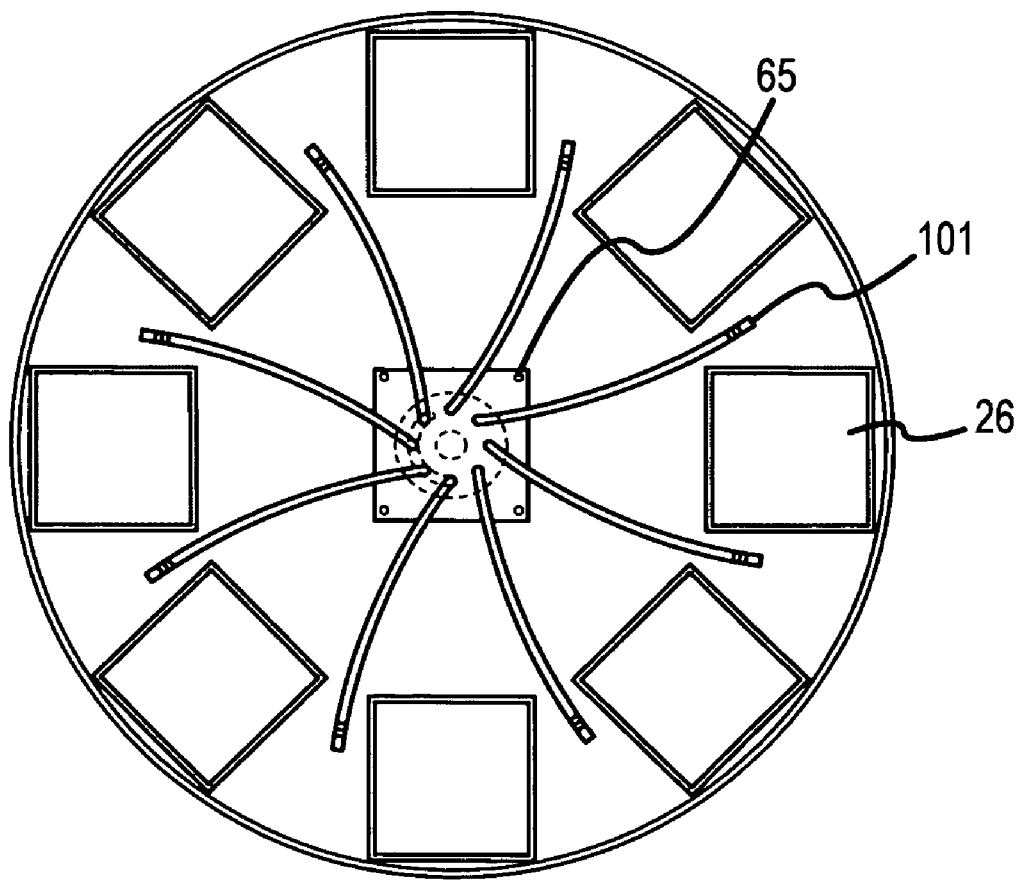
FIG. 14 is a schematic view of an air distribution system.

Chamber members 41 are mounted in circumferential spaced relation along a perimeter of an interior of the drum member 25, as shown in FIGS. 2, 3, 4, 5 and 12, and are sealed with end blocks or plugs 28 and attached to end caps 26 of the opposite end walls 27 and 29 as shown in FIG. 5 and FIG. 12. Preferably, eight chambers are mounted in the drum member but fewer or greater numbers may also be used. Each chamber member 41 is preferably made of steel or a non-corrosive material and is defined by four side walls 43, 45, 47 and 49, forming a squared chamber having four closed joined ends or corners 51, 53, 55 and 56 as shown in FIGS. 12 and 13. Open portion(s) 57 provide for the passage of water and air into and out of each chamber member 41. The open portion(s) 57 are located along a substantial length of the rectangular chamber 41 as shown in FIGS. 12 and 13 and may also comprise sectional openings or any other type of opening that allows for water and air passage. The mechanism used to introduce air under pressure into the chambers consists of a power source driven air compressor C as shown in FIG. 1 or from a solar rechargeable battery powered compressor (not shown). The air compressor C may be located at either end of the frame 11 and has an air line 34 that runs from the air compressor C to the frame 17 and into an angle fitting, not shown, that is threaded into an air distribution manifold 59 at entry bore 61. Air is then fed through entryway 62 and into a semi-circular slot 63 that is milled into the smooth mating surface of the manifold 59 for about 120 degrees from approximately 6 O'clock to 11 O'clock in a clockwise direction as shown in FIG. 9. The air distribution manifold 59 is mated with an air distribution block 65, the block 65 and the manifold 59 each having a centrally located bore 67 to accommodate the axle 23 allowing for rotation of the drum, as shown schematically in FIG. 12. The air distribution manifold 59 has a milled portion 73 on the outside face of the manifold 59 that fits over the tubular steel drum support frame 11 and keeps the manifold from rotating about the drum axle. An "O" ring seal 75 rests in a stabilization slot 77 on the outside perimeter of the manifold 59 insuring a complete seal between the manifold 59 and the block 65, preventing any air from escaping from between the surfaces of the manifold 59 and the air distribution block 65.

The air distribution block 65 has bores, preferably eight, 79, 81, 83, 85, 87, 89, 91 and 93 that are approximately 45 degrees apart and intersect with and are connected to eight threaded openings 79', 81', 83', 85', 87', 89', 91' and 93' located along the perimeter of the block 65. Fittings (not shown) are then inserted into each of the threaded openings and connected to flexible hoses 101 that feed air to each chamber consecutively around the perimeter of the end wall 27 through a bore fitting 62. The block 65 is secured to the end wall 27 with bolts 72, 74, 76 and 78. The air distribution system may be secured to either the end wall 27 or the end wall 29, but in this embodiment is preferably secured to just one end wall for air distribution at one end of the chambers 41.

Figure 17:
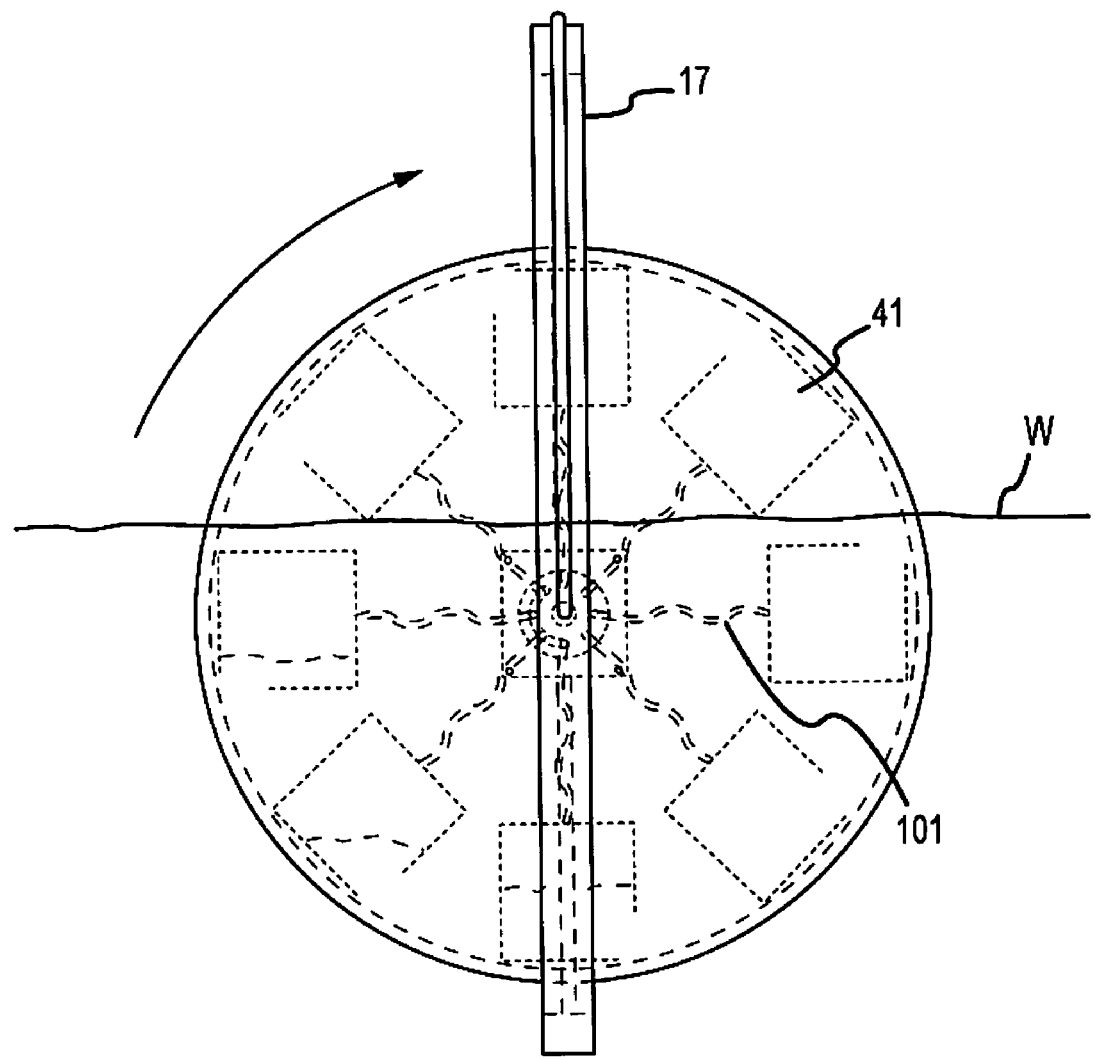
FIG. 17 is a schematic of the drum rotation apparatus of FIG. 2.

In use, the drum member and frame 11 are submerged, preferably at least 50% in a body of water W as shown in FIG. 17. Each chamber is filled with water, the drum is in equilibrium and the drum member is not rotating. When air is introduced into the manifold 59 and distributed to the air distribution block 65 through the channel 63, the hoses 101 that feed air to the chambers 41 receive air from the air distribution block 65. Pressurized air is introduced sequentially into the chambers with the air displacing the water and providing a force equal to the weight of the water that had been displaced. The air flow to the chambers 41 is dependent upon the position of the air hose 101, and consequently the bores 79, 81, 83, 85, 87, 89, 91 and 93 with respect to the channel 63. When the bores are in the 6 O'clock to 11 O'clock position with respect to the stationary manifold 59, the channel provides air through the bores 85, 87, 89 and 91 to the hoses 101 and consequently the chambers secured to the hoses, within that range. While the manifold 59 remains stationary, the block 65 rotates in a clockwise fashion. As a result, the bores and the air hoses 101 shift positions and air is distributed sequentially to the chambers in the 6 O'clock to 11 O'clock positions. As the chambers 41 fill with air, the water is forced out. Following the physics of flotation, an upward force is created that is in proportion to the weight of the water that is being displaced. Rotation of the drum member 25 is accomplished through the buoyant weight differential of the chambers. As the chambers 41 progress to the 12 O'clock position, the air escapes and is rapidly replaced with water as shown by way of example only and not limitation, in FIG. 17. The speed of rotation of the drum member 25 can be controlled by regulating the volume and pressure of the induced air. Because the drum member 25 is supported on low friction bearings, it is possible to turn large drums with a very small compressor.

When the apparatus is placed in the flow of water, e.g., a stream, typically partially submerged, water flows into the path of the drum screen 35, and much of the water passes through the screen and exits downstream. Particles and other debris, however, tend not to flow through the openings in the screen but may be carried on the face of the drum screen 35 and deposited at an exit portion with the filtered water while fish are deterred from approaching the drum member 25. The drum screen is self-cleaning so that the debris is washed off of the screen. This self-cleaning aspect avoids the need for any type of regular maintenance or cleaning device to remove debris from the screen.

The air lift rotation allows the drum to be large, relatively maintenance-free and economical to construct. This allows for the screening of large agricultural diversions that would be cost-prohibitive if other configurations of drums were used. It will also provide an alternative to large costly plate screens that require raking type cleaners due to debris caught on the screen. The rotation of the drum screen containing the chamber members 41 also acts as a deterrent to fish based on the turbulence zone surrounding the rotating drum screen due to the drum rotation and the internal chambers striking the water.

ALTERNATE FORMS

Figure 15:
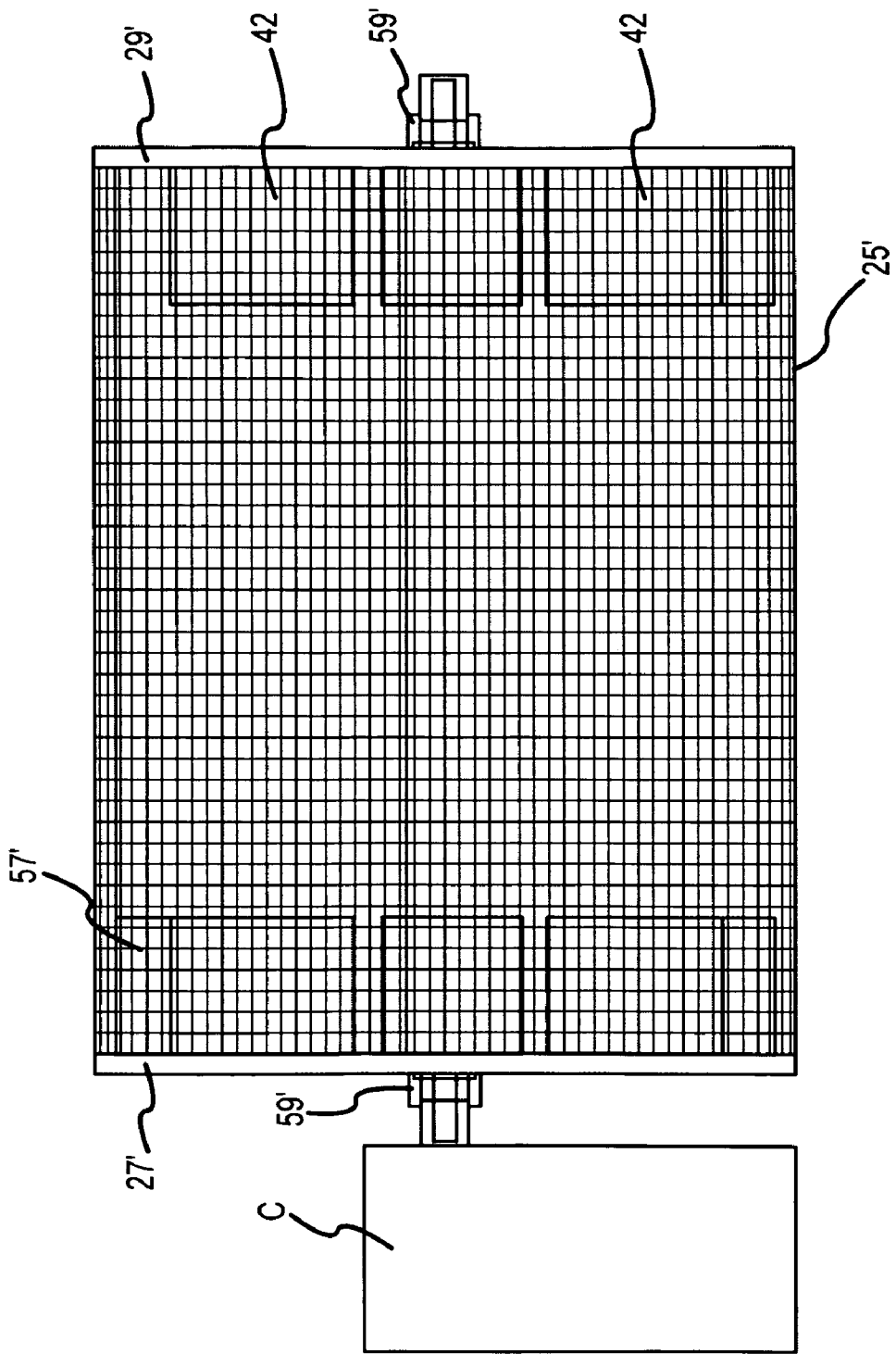
FIG. 15 is an alternate form of drum rotation apparatus.

An alternate form of invention is illustrated in FIG. 15 in which like parts are correspondingly enumerated to those of FIGS. 1 to 14. The drum screen 25' is of a cylindrical form and is rotatably mounted upon the axle 23' utilizing modified flotation chambers 42. The modified chambers 42 are circumferentially mounted along a perimeter of an interior of the drum member 25' and attached to opposite end walls 27' and 29'. Each chamber member 42 forms a cubic chamber having an air and water passage portion 57'. Sequential air induction occurs in the same manner as described previously with the addition of a manifold 59' and a block (not shown) on each end wall 27' and 29' for air distribution to each chamber 42.

Figure 16:
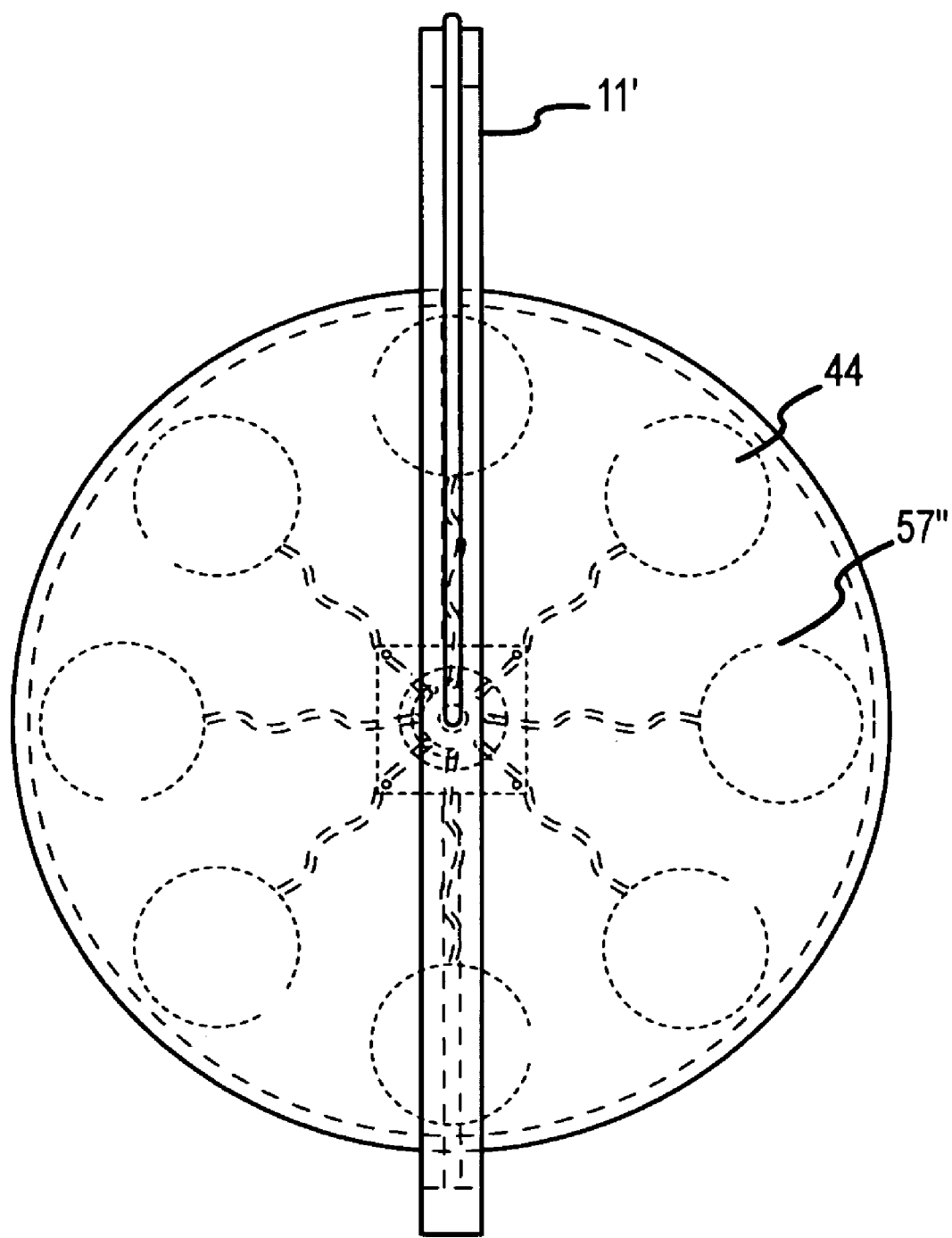
FIG. 16 is an alternate form of drum rotation apparatus.

Another form of apparatus is illustrated in FIG. 16 in which like parts are correspondingly enumerated to those of FIGS. 1 to 14. The alternate form has chamber members 44 that are circular in shape and cylindrical in form with an air and water passage area 57". It will be appreciated that the chamber members may take many different forms but accomplish the same end result without departing from the spirit of the apparatus.

While a number of exemplary aspects, embodiments and methods have been discussed above, those of skill in the art will recognize certain modifications, permutations, additions and subcombinations thereof. It is therefore intended that the following appended claims and claims hereafter introduced are interpreted to include all such modifications, permutations, additions and subcombinations as are within their true spirit and scope.

I claim:

1. Apparatus for separating fish from debris and allowing water passage, comprising:
    a drum member rotatably mounted on a frame, said drum member having an exterior screen in the path of flow of the water passage;
    a plurality of circumferentially spaced chamber members secured within an interior of said drum member; and
    means for distributing air throughout said chamber members.

2. Apparatus according to claim 1 wherein each of said chamber members is defined by four side walls attached at opposite ends forming a rectangle and having means for air and water passage therein.

3. Apparatus according to claim 2 wherein said air and water passage means include at least one opening along a portion of said chamber member.

4. Apparatus according to claim 2 whereas said chamber member traverses the length of said drum member.

5. Apparatus according to claim 2 wherein said chamber members include end blocks.

6. Apparatus according to claim 1 wherein said at least one chamber member is circumferentially mounted along an interior drum perimeter.

7. Apparatus according to claim 1 wherein said air distribution means includes an air distribution manifold and an air distribution block.

8. Apparatus according to claim 7 wherein said air distribution manifold is mated to said air distribution block.

9. Apparatus according to claim 7 wherein said air distribution manifold includes a semi-circular air channel.

10. Apparatus according to claim 7 wherein said air distribution block includes hoses that distribute air to said plurality of chamber members.

11. An apparatus for separating fish and debris from water comprising:
    a rectangular, tubular frame member disposed in the path of flow of the water having an inlet and an outlet;
    a rotating drum member mounted with an axle on said frame member, said drum member including debris-collecting means secured along an exterior surface of said drum member;
    chamber means circumferentially mounted along an interior perimeter surface of said drum member for rotation of said drum member; and
    air supply means attached to said chamber means for sequentially forcing air into said chamber means.

12. Apparatus according to claim 11 wherein said chamber means includes a plurality of open compartments longitudinally extending within said drum member.

13. Apparatus according to claim 11 wherein said debris collecting means includes a wedge wire screen.

14. Apparatus according to claim 11 wherein said air supply means include an air distribution manifold and an air distribution block.

15. An apparatus for separating fish and debris from water comprising:
    a frame member for receiving a rotating drum member;
    said rotating drum member including a wedge wire screen filter along an exterior of said drum member;
    chamber members within said drum member traversing a length of said drum member;
    said chamber members defined by an open portion and dual end plugs; and
    air distribution means for directing air into said open portion of said chamber members.

16. Apparatus according to claim 15 wherein said air distribution means includes a rotation block and a stationary manifold mated together providing selective access to air.

17. Apparatus according to claim 15 wherein said chamber members are defined by circular cylindrical shaped compartments.

18. Apparatus according to claim 15 wherein said chamber members are disposed in vertically spaced relation to one another.

19. Apparatus for separating fish from debris and allowing water passage through selective distribution of air, comprising:
    a drum member rotatably mounted on a frame, said drum member having an exterior screen in the path of flow of the water passage;
    a plurality of circumferentially spaced chamber members secured within an interior of said drum member;
    a manifold member defined by an air inlet;
    said manifold member having a semi-circular channel member;
    an air distribution block adapted to be mated with said manifold member;
    said air distribution block having corresponding bores to allow passage of air from said channel member; and
    an air compressor member attached to said manifold member.

20. Apparatus according to claim 19 wherein said manifold member includes an O ring.

21. Apparatus according to claim 19 wherein said manifold member includes a stabilization slot.

* * * * *